Nov. 8, 1955          A. E. DENTLER          2,723,114
SHOCK ABSORBING MEANS FOR SHIPPING CONTAINERS
Filed Sept. 14, 1951
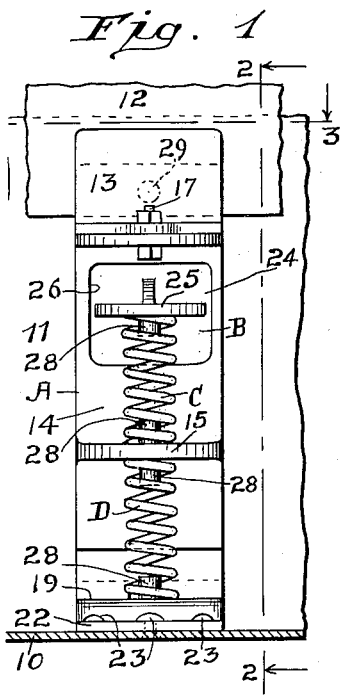
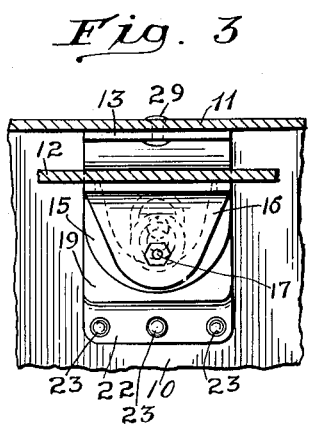
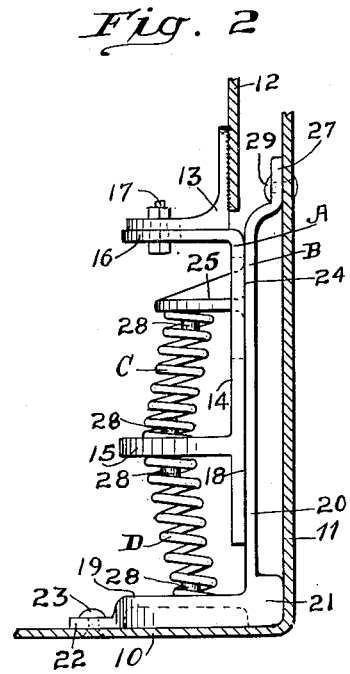
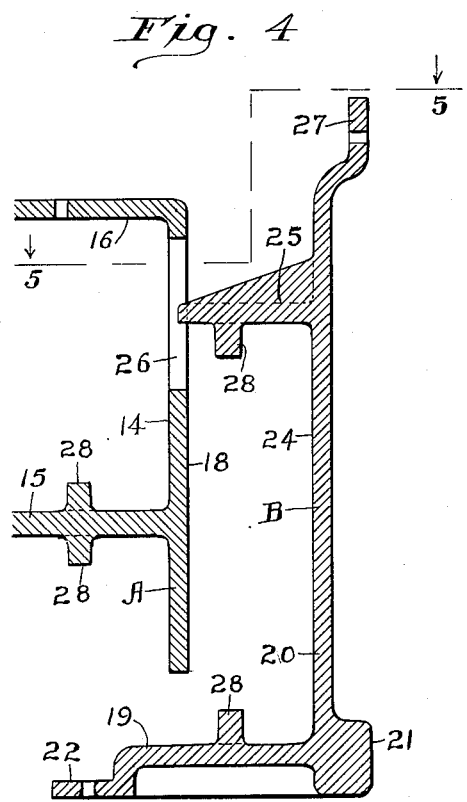
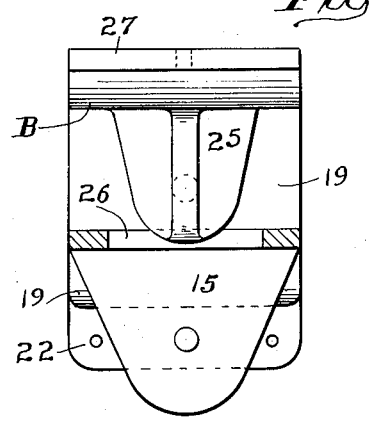
Inventor:
Arnold E. Dentler.
By Henry Fuchs
Atty.

United States Patent Office 2,723,114
Patented Nov. 8, 1955

2,723,114

SHOCK ABSORBING MEANS FOR SHIPPING CONTAINERS

Arnold E. Dentler, Western Springs, Ill., assignor to W. H. Miner, Inc., Chicago, Ill., a corporation of Delaware Application September 14, 1951, Serial No. 246,679

7 Claims. (Cl. 267—1)

This invention relates to improvements in lading supporting shock absorbing means, especially designed for use in connection with shipping containers.

One object of the invention is to provide a shock absorber of simple design, for supporting a relatively heavy article in a shipping container.

A more specific object of the invention is to provide a shock absorber of the character indicated, comprising relatively sliding friction elements designed to be secured respectively to the container and a support carrying the lading within the container, and spring means yieldingly opposing relative sliding movement of the friction elements and design to press the friction elements into tight frictional engagement with each other.

Other objects of the invention will more clearly appear from the description and claims hereinafter following.

In the accompanying drawing forming a part of this specification, Figure 1 is a front elevational view of my improved shock absorber, illustrating the same applied to a shipping container, a fragment of the bottom portion of the container being shown in vertical section with one of the side walls of said container in elevation. Figure 2 is a vertical sectional view on a plane at right angles to the section shown in Figure 1, corresponding substantially to the line 2—2 of Figure 1 and illustrating the improved shock absorber in side elevation. Figure 3 is a horizontal sectional view, corresponding substantially to the line 3—3 of Figure 1, showing the improved shock absorber in plan. Figure 4 is a vertical sectional view through the friction elements of the improved shock absorber, illustrating a step of the operation of assembling the shock absorber. Figure 5 is a horizontal sectional view of Figure 4, corresponding substantially to the irregular line 5—5 of Figure 4.

In said drawing, 10 indicates the bottom wall, and 11 one of the vertical side walls of a well-known construction of shipping container for an article, in this instance, an airplane motor. A portion of the housing in which the motor is mounted is indicated by 12, the portion 12 being part of a vertical wall section of said housing. To this portion 12 is welded an angle bracket 13, which is employed for connecting the housing to my improved shock absorber.

My improved shock absorber comprises broadly a pair of relatively slidable friction elements A and B and a pair of springs C and D yieldingly opposing relative lengthwise movement of the friction elements and also pressing the same into tight frictional engagement with each other.

The friction element A comprises an elongated, vertically disposed plate member 14 having a laterally projecting, horizontal shelf on its inner side between the ends thereof, forming a spring abutment 15. At its upper end, the plate member 14 is bent inwardly at right angles to provide a horizontally disposed attaching flange 16 by which the plate member 14 is secured to the angle bracket 13 carried by the housing for the airplane motor or other article being shipped in the freight container. As shown, a bolt 17 extending through the flange 16 and the horizontal section of the angle bracket 13 is preferably employed to secure the friction element A to said angle bracket. The outer side of the plate member 14 of the friction element A presents a flat, vertically extending friction surface 18, adapted to slide on the friction element B.

The friction element B comprises a base portion 19 and a vertically disposed plate member 20 upstanding therefrom. The base portion 19 has a portion 21 thereof fitting in the corner between the horizontal bottom wall 10 and the vertical side wall 11 of the shipping container, the portion 21, which fits in this corner, projecting outwardly beyond the plate member 20 and serving to hold this plate member spaced from the wall 11 of the shipping container. The base portion 19 is supported on the bottom wall 10 of the container and has a securing flange 22 at its inner end which is fixed to the wall 10 by rivets 23 extending through said flange and said wall 10. The upper side of the base portion 19 forms a spring abutment for the lower end of the spring D.

The plate member 20 presents a vertically extending flat friction surface 24 on its inner side with which the friction surface 18 of the plate member 14 of the friction element A has sliding contact. Near its upper end, on the inner side thereof, the plate member 20 of the friction element B has a laterally inwardly extending, horizontal spring abutment flange 25 projecting through a vertical guide opening 26, provided in the plate member 14 of the element A. As shown most clearly in Figure 2, the spring abutment 15 of the friction element A projects slightly beyond the abutment flange 25 of the friction element B. At its upper end, the plate member 20 is provided with an outwardly offset, attaching portion 27, which is secured to the side wall 11 of the shipping container by any suitable means, being preferably fastened by rivets 29—29 extending through said outwardly offset portion and the wall 11. Each spring C and D is in the form of a helical coil, the spring C being interposed between the top side of the spring abutment 15 of the element A and the bottom side of the spring abutment flange 25 of the element B, and the spring D being interposed between the base portion 19 of the element B and the underneath side of the spring abutment 15 of the element A.

In the assembled condition of the shock absorber, the springs C and D are cantingly distorted so that they have a tendency to return to vertical upright position, thereby pressing the friction elements A and B against each other. To hold the springs C and D in position on the spring abutment 15, the abutment flange 25, and the base portion 19, spring centering projections or pins 28—28 are provided on these parts, which engage within the ends of the spring coils, the abutment 15 of the element A being provided with an upstanding pin 28 on its top side engaged in the bottom end of the spring C and a depending pin 28 on its bottom side engaged in the upper end of the spring D, the spring abutment flange 25 of the element B being provided with a depending pin 28 engaged within the upper end of the spring C, and the base portion 19 being provided with an upstanding pin 28 engaged in the bottom end of the spring D.

In assembling the shock absorber, the friction elements A and B are first placed side by side with the spring abutment 25 of the element B opposed to the guide opening 26 of the element A, as illustrated in Figures 4 and 5. The two elements A and B are then moved laterally into engagement with each other, approximately to the position shown in Figure 2. The element A is then moved upwardly as high as possible, and the spring D placed in position between the base portion 19 and the spring abutment 15. The spring D is then compressed by depressing the member A. With the parts in this position, the spring C is placed in position between the spring abutment flange 25 of the element B and the spring abutment 15 of the element A. After this has been done, the pressure is removed from the element A, permitting the parts to assume the normal position shown in Figure 2. After the parts have been thus assembled, the shock absorber is placed in position in the shipping container and the base portion 19 and the upper end of the plate member 20 of the same riveted to the bottom wall 10 and the vertical wall 11, respectively, of the shipping container. The shipping container is thus prepared to receive the article to be housed therein. When the article to be shipped is placed in the container, it is secured to the friction element A by the angle bracket 13, as hereinbefore described.

As will be evident, the spring C and D resist both upward and downward movement of the friction element A with respect to the friction element B, the spring D being compressed against the base portion 19 of the element B as the element A moves downwardly while the spring C expands, and the spring C being compressed against the spring abutment flange 25 of the element B as the element A moves upwardly while the spring D expands. During this relative sliding movement of the friction elements A and B, in addition to the cushioning effect provided by these springs, relatively high frictional resistance is also provided, due to sliding of these elements on each other, the same being held in tight frictional contact by the distorted springs C and D.

I claim:

1. In a shock absorber, the combination with a pair of relatively lengthwise movable friction elements in sliding contact with each other; of a pair of laterally projecting spring abutments on one of said elements, said abutments being spaced apart lengthwise of said element; a single spring abutment on the other of said elements, said single abutment projecting laterally from said last named element and being embraced between the spring abutments of said pair; a pair of compression springs, one of said springs being interposed between and bearing on said single spring abutment and one of said abutments of said pair, and the other of said springs being interposed between and bearing on said single spring abutment and the other of said abutments of said pair; and spring centering projections on said abutments engaged with said springs, the centering projections on said pair of spring abutments being offset laterally with respect to said single spring abutment for holding said springs in distorted canted position to press said elements together.

2. In a shock absorber, the combination with a pair of relatively lengthwise movable friction elements in sliding contact with each other; of a pair of laterally projecting spring abutments on one of said elements, said abutments being spaced apart lengthwise of said element; a single spring abutment on the other of said elements, said single abutment projecting laterally from said last named element and being embraced between the spring abutments of said pair; a pair of compression springs, one of said springs being interposed between and bearing on said single spring abutment and one of said abutments of said pair, and the other of said springs being interposed between and bearing on said single spring abutment and the other of said abutments of said pair; and spring centering lugs on said abutments engaged in the ends of said springs, the lugs of said pair of abutments being offset laterally with respect to the lugs of said single abutment holding the latter in canted distorted positions to press said elements together.

3. In a shock absorber, the combination with a friction element including a lengthwise extending, vertically disposed plate member having a friction surface on one side thereof and a pair of horizontally disposed spring abutments projecting from the friction surface side of the same, said abutments being spaced lengthwise of said member; of a second friction element including a lengthwise extending, vertically disposed plate member having a friction surface on one side thereof engaged with the friction surface of said first named plate member; a horizontally disposed spring abutment projecting from the opposite side of said second named plate member, said last named abutment being between the ends of said second named plate member and embraced between said pair of abutments; and a pair of coil compression springs having their axes inclined to the vertical, one of said springs being interposed between and bearing on said spring abutment of said second named member and one of said abutments of said pair, and the other of said springs being interposed between said spring abutment of said second named member and the other of said abutments of said pair.

4. In a shock absorber, the combination with a pair of relatively lengthwise movable friction elements in sliding contact with each other; of a pair of laterally projecting spring abutments on one of said elements, said abutments being spaced apart lengthwise of said element; a single spring abutment on the other of said elements, said abutment projecting laterally from said last named element and being embraced between the spring abutments of said pair; and a pair of springs, said springs being inclined in reverse direction with respect to the vertical, said springs being under initial compression, one of said springs being interposed between and bearing on said single spring abutment and one of said abutments of said pair, and the other of said springs being interposed between and bearing on said single spring abutment and the other of said abutments of said pair.

5. In a shock absorber, the combination with a friction element including a lengthwise extending, vertically disposed plate member having a friction surface on one side thereof and a pair of horizontally disposed spring abutments projecting from the friction surface side of the same, said abutments being spaced lengthwise of said member; of a second friction element including a lengthwise extending, vertically disposed plate member having a friction surface on one side thereof engaged with the friction surface of said first named plate member; a horizontally disposed spring abutment projecting from the opposite side of said second named plate member, said last named abutment being between the ends of said second named plate member and embraced between said pair of abutments; a pair of springs, said springs being under initial compression, one of said springs being interposed between and bearing on said spring abutment of said second named member and one of said abutments of said pair, and the other of said springs being interposed between said spring abutment of said second named member and the other of said abutments of said pair; and centering lugs on said elements engaged in the ends of said springs, holding the latter in canted distorted position to press said elements together.

6. In a shock absorber, the combination with a friction element including a base portion and a friction plate member upstanding from said base portion, said plate member having a lengthwise extending friction surface on one side thereof, said base portion projecting laterally from said friction surface side of said member; of a horizontally disposed spring abutment on said plate member near the upper end thereof, said spring abutment projecting from the friction surface side of said member; a second friction element, said second friction element including a vertically disposed friction plate member having a friction surface on one side thereof engaged with the friction surface of said first named member, said second named member having a horizontal spring abutment between the ends thereof projecting from the opposite side of the same, said last named spring abutment being disposed between said base portion and said spring abutment of said first named member; and a pair of springs, one of said springs being interposed between and bearing on said spring abutments of said first and second named members, and the other of said springs being interposed between and bearing on said base portion of said first named member and said spring abutment of said second named member, said springs being under initial compression and in canted distorted condition.

7. In a shock absorber, the combination with a friction element including a base portion and a friction plate member upstanding from said base portion, said plate member having a lengthwise extending friction surface on one side thereof, said base portion projecting laterally from said friction surface side of said member; of a horizontally disposed spring abutment on said plate member near the upper end thereof, said spring abutment projecting from the friction surface side of said member; a second friction element, said second friction element including a vertically disposed friction plate member having a friction surface on one side thereof engaged with the friction surface of said first named member, said second named member having a right angular, securing flange at the upper end of said plate, and a horizontal spring abutment between the ends thereof projecting from the opposite side of the same, said last named spring abutment being disposed between said base portion and said spring abutment of said first named member; and a pair of springs, one of said springs being interposed between and bearing on said spring abutments of said first and second named members, and the other of said springs being interposed between and bearing on said base portion of said first named member and said spring abutment of said second named member, said springs being under initial compression and in canted distorted condition.

References Cited in the file of this patent

UNITED STATES PATENTS

| | | |
|---|---|---|
| 1,151,771 | Erickson | Aug. 31, 1915 |
| 1,162,138 | Clark | Nov. 30, 1915 |
| 1,462,737 | Boswell | July 24, 1923 |
| 1,537,994 | McGeorge | May 19, 1925 |
| 1,826,126 | Delahanty | Oct. 6, 1931 |
| 2,203,392 | Pica | June 4, 1940 |
| 2,495,920 | Dentler | Jan. 31, 1950 |